US008706674B2

(12) United States Patent
Yang et al.

(10) Patent No.: US 8,706,674 B2
(45) Date of Patent: Apr. 22, 2014

(54) MEDIA TAG RECOMMENDATION TECHNOLOGIES

(75) Inventors: Linjun Yang, Beijing (CN); Lei Wu, Hefei (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/537,802

(22) Filed: Jun. 29, 2012

(65) Prior Publication Data

US 2012/0265772 A1 Oct. 18, 2012

Related U.S. Application Data

(63) Continuation of application No. 12/396,885, filed on Mar. 3, 2009, now Pat. No. 8,239,333.

(51) Int. Cl.
*G06F 19/00* (2011.01)
*G06T 1/00* (2006.01)

(52) U.S. Cl.
USPC .......................................................... 706/50

(58) Field of Classification Search
USPC .......................................... 706/12; 707/4, 9
See application file for complete search history.

(56) References Cited

U.S. PATENT DOCUMENTS

| 7,788,247 | B2 | 8/2010 | Wang |
| 2006/0248068 | A1* | 11/2006 | Chien et al. ........................ 707/4 |
| 2009/0060351 | A1 | 3/2009 | Li |
| 2010/0106486 | A1 | 4/2010 | Hua |

OTHER PUBLICATIONS

Akbas, "Automatic Image Annotation by Ensemble of Visual Descriptors", CVPR 2007, IEEE, Jun. 17, 2007.
Ames, "Why We Tag: Motivations for Annotation in Mobile and Online Media", CHI 2007, ACM, May 2, 2007.
Amores, "Context-Based Object-Class Recognition and Retrieval by Generalized Correlograms", TPAMI 2007, IEEE, Oct. 2007.
Bar-Yossef, "Random Sampling from a Search Engine's Index", WWW 2006, ACM, May 24, 2006.
Blythe, "Incremental Formalization of Document Annotations through Ontology-Based Paraphrasing", WWW 2004, ACM, May 17, 2004.
Boll, "Semantics, content, and structure of many for the creation of personal photo albums", MM 2007, ACM, Sep. 23, 2007.
Freund, "An Efficient Boosting Algorithm for Combining Preferences", ICML 1998, Jul. 24, 1998.
Koloniari, "Query Workload Aware Overlay Construction Using Histograms", CIKM 2005, ACM, Oct. 31, 2005.
Li, "PFP: Parallel FP-Growth for Query Recommendation", RecSys 2008, ACM, Oct. 23, 2008.

(Continued)

*Primary Examiner* — Jeffrey A Gaffin
*Assistant Examiner* — Ola Olude Afolabi
(74) *Attorney, Agent, or Firm* — Carole Boelitz; Micky Minhas (57) ABSTRACT

Technologies for recommending relevant tags for the tagging of media based on one or more initial tags provided for the media and based on a large quantity of other tagged media. Sample media as candidates for recommendation are provided by a set of weak rankers based on corresponding relevance measures in semantic and visual domains. The various samples provided by the weak rankers are then ranked based on relative order to provide a list of recommended tags for the media. The weak rankers provide sample tags based on relevance measures including tag co-occurrence, tag content correlation, and image-conditioned tag correlation.

20 Claims, 4 Drawing Sheets

(56) References Cited

OTHER PUBLICATIONS

Liu, "Dual Cross-Media Relevance Model for Image Annotation", MM 2007, ACM, Sep. 23, 2007.
Mairal, "Supervised Dictionary Learning", IRNIA, Sep. 18, 2008.
Rui, "Bipartite Graph Reinforcement Model for Web Image Annotation", MM 2007, ACM, Sep. 23, 2007.
Sigurbjörnsson, "Flickr Tag Recommendation based on Collective Knowledge", WWW 2008, ACM, Apr. 21, 2008.
Wang, "Content-Based Image Annotation Refinement", CVPR 2007, IEEE, Jun. 17, 2007.
Wu, "Flickr Distance", MM 2008, ACM, Oct. 26, 2008.
Wu, "Visual language modeling for image classification", MIR 2007, ACM, Sep. 24, 2007.
Yan, "Query Expansion using Probabilistic Local Feedback with Application to Multimedia Retrieval", CIKM 2007, ACM, Nov. 6, 2007.
Yu, "Distance Learning for Similarity Estimation", TPAMI 2007, IEEE, Mar. 2008.
Zheng, "Visual Synset: Towards a Higher-level Visual Representation", CVPR 2008, IEEE, Jun. 23, 2008.
Naaman, et al., "ZoneTag's Collaborative Tag Suggestions: What is This Person Doing in My Phone?", Retrieved at http://infolab.stanford.edu/~mor/research/ZoneTagIEEEMM.pdf, IEEE Multimedia, vol. 15, No. 3, pp. 34-40, Jul.-Sep. 2008.
Qi, et al., "Correlative Multi-Label Video Annotation", Retrieved at http://research.microsoft.com/en-us/um/people/xshua/publications/pdf/2007_acmmm_cml.pdf, MM'07, Sep. 23-28, 2007, Augsburg, Bavaria, Germany.
Qi, et al., "Supporting OLAP Operations over Imperfectly Integrated Taxonomies", Retrieved at http://aria.asu.edu/candan/papers/fp328-qi.pdf, SIGMOD'08, Jun. 9-12, 2008, Vancouver, BC, Canada.
Sen, et al., "Tagging, communities, vocabulary, evolution", Retrieved at http://www.grouplens.org/papers/pdf/sen-cscw2006.pdf, CSCW'06, Nov. 4-8, 2006, Banff, Alberta, Canada.
Snoek, et al., "Adding Semantics to Detectors for Video Retrieval", Retrieved at http://staff.science.uva.nl/~mdr/Publications/Files/tmm2007.pdf, IEEE Transactions on Multimedia, vol. 9, No. 5, Aug. 2007.

\* cited by examiner

MEDIA TAG RECOMMENDATION TECHNOLOGIES

RELATED APPLICATION(S)

This application is a continuation of and claims benefit from U.S. patent application Ser. No. 12/396,885, filed Mar. 3, 2009, which is incorporated herein by reference in its entirety.

BACKGROUND

The popularity of digital media and the Internet has resulted in easy access to extremely large volumes of digital media, including images, video, audio, and the like. Accurate identification of such media is important for effective searching; that is, search results are dependent on the quality of media identification. Digital media is typically identified or classified using media annotations or keywords, commonly known as "tags". Methods of "tagging" media tend to be tedious and expensive, not well-suited to automation. Manual tagging—tagging by a human being—often results in the highest quality tags. But the sheer volume of digital media makes manual tagging a challenge. Social tagging (a form of manual tagging involving groups of people, also known as folksonomy, collaborative tagging, social classification, social indexing, and the like), the practice of collaboratively tagging digital media, can be advantageous. However, noisy tags frequently appear and users typically do not tag all semantic elements in the media.

Noise with respect to media tagging generally refers to inaccurate or misleading identification of media, typically due to low-quality tags. Noise may result from synonyms (multiple tags for the same media, e.g., "sea" and "ocean"), homonymy (same tag with different meanings, e.g., "apple" the fruit and "Apple" the company), and polysemy (same tag with multiple related meanings, e.g., "to get" meaning either "to take" or "to understand"). Noise may also result from misspelled tags or the like, and/or from semantically-empty tags (tags that provide little or no useful identification (e.g., "image", "photo", "nice", "cool", etc. are examples of semantically-empty tags for a picture of a dog or some such thing). Such noise may reduce the efficiency and accuracy of media indexing, searching, and the like. Automatic methods of tagging have proven to be quite noisy. Social tagging can also result in noise, but is generally more accurate than automated tagging.

Semantic loss with respect to media tagging generally refers to meaning or elements in the media that are not explicitly identified by tags. That is, when some element in an image is overlooked such that no corresponding tag is provided, semantic loss results. For example, given an image of a car, tags may be provided including "car", "vehicle", and "auto". But if no tag for "tires" is provided and the image includes tires, then semantic loss results. In this example, a search on "tires" would not produce the image even though it includes tires.

To minimize noise and compensate for semantic loss, technologies for tag recommendation such as those described herein may be used that improve the quality of social tagging.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for recommending relevant tags for the tagging of media based on one or more initial tags provided for the media and based on a large quantity of other tagged media. Sample tags as candidates for recommendation are provided by a set of weak rankers based on corresponding relevance measures in semantic and visual domains. The various samples provided by the weak rankers are then ranked based on relative order to provide a list of recommended tags for the media. The weak rankers provide sample tags based on relevance measures including tag co-occurrence, tag content correlation, and image-conditioned tag correlation.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implementable in a computing environment, the environment described is provided as an example and not a limitation. As those skilled in the art will appreciate, the present examples are suitable for application in a variety of different types of computing environments.

Figure 1:
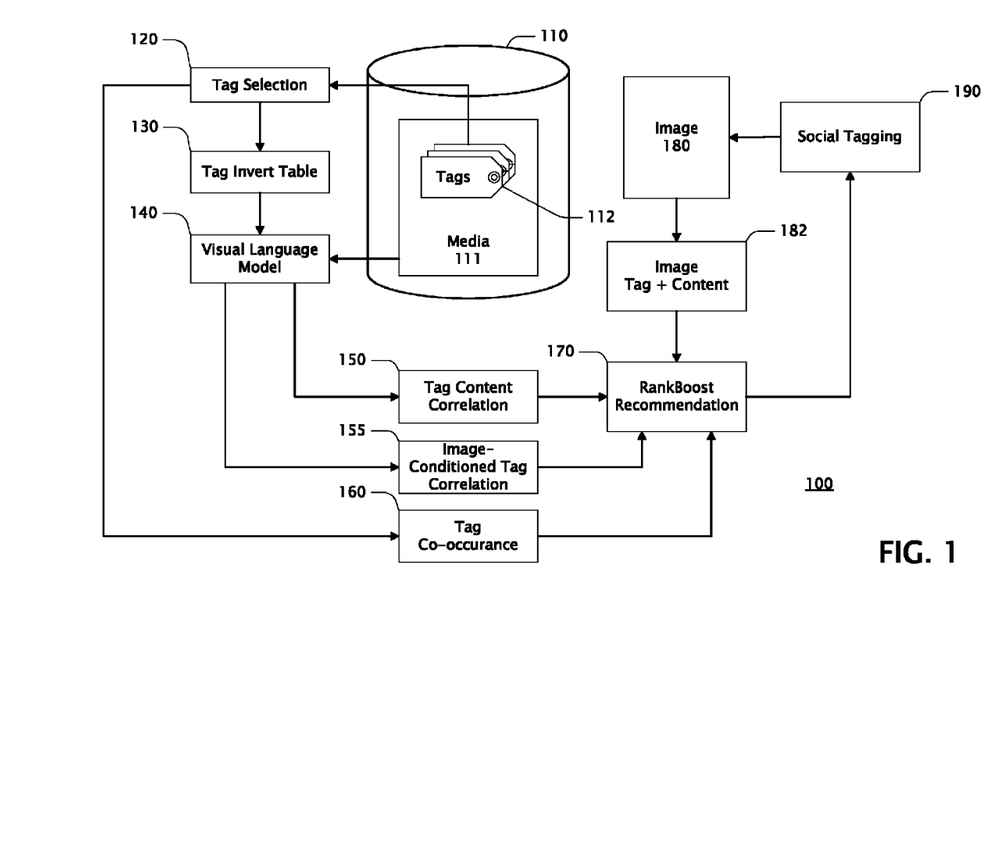
FIG. 1 is a block diagram showing an example system that is operable to recommend tags for a media instance.

FIG. 1 is a block diagram showing an example system 100 that is operable to recommend tags for a media instance, such as image 180. System 100 typically makes use of a media store, such as example media store 110 or the like. In one example, such a media store is a media sharing web site such as Flickr. Such media stores generally include a large number (e.g., hundreds of millions) of images and/or other digital media that have been uploaded to the media store by many thousands of independent users. In another example, media store 110 is a "working collection" or subset of another media store such as a photo sharing website. In general, media store 110 may be any collection of tagged media, preferably comprised of a large number of media. Each example media 111 in example media store 110 is typically tagged with one or more tags 112 by the uploading users and/or others. Such tagged media may be referred to herein as media/tag pairs where one or more tags are associated with a media instance. The terms "media" and "media instance" as used herein generally refer to a digital media such as an image, video, audio, or the like. In general, users may include human beings, and/or computing systems or the like. System 100 generally recommends tags based on the combination 182 of example image 180 and a least one tag for image 180 typically provided by a user, the at least one tag being descriptive of image 180. Example image 180 may be any type of digital media or the like; the use of an image herein is simply for convenience and is not intended as a limitation. The user may select 190 one or more of the recommend tags (e.g., from block 170) for further tagging of image 180. In general, the recommended tags semantically and/or visually correlate with the target media, such as example image 180.

Block 120 typically indicates an element(s) that selects candidate tags for possible recommendation. Such candidate tags are typically selected from those of media store 110 that correlate with tag(s) provided for a media instance provided by the user, such as the tag(s) in combination 182. In one example, a tag is selected from data store 110 if it is associated with a media that also includes the tag provided by the user (e.g., that of 182). For example, if image 180 is of a dog, and the user provides a corresponding tag "dog", then media store 110 is searched for instances of media instances including a tag comprising "dog". The resulting instances of media with a tag comprising "dog" may also, for example, include other tags such as "canine", "animal", "pooch", or the like. Such other tags make up the candidate tags. Such a tag pair of a media instance, such as "dog" and "canine", are said to be "co-occurring" where the co-occurrence is considered raw or "raw co-occurrence".

Block 160 typically indicates an element(s) that calculates a symmetric and asymmetric normalization of the raw co-occurrence provided by the element of block 120, and provides tag co-occurrence ("TC") measures—a measure of tag similarity in the semantic domain. The two normalizations provide a symmetric TC relevance measure and an asymmetric TC relevance measure. In one example, the asymmetric TC relevance measure between two tags is defined as follows:

$$R_{tag}^a(t_i, t_j) = \frac{|t_i \cap t_j|}{|t_i|}$$

where $t_i$ and $t_j$ are any two tags, such as the user-provided tag for image 180 and a tag associated with an image in media store 110. In one example, tag $t_i$ is a user-provided tag for a target media and tag $t_j$ is a co-occurring tag from a media store, such as media store 110. $|t_i|$ typically represents the number of times that tag $t_i$ appears in the media database. The resulting asymmetric TC relevance measure captures how often tag $t_i$ co-occurs with tag $t_j$ normalized by the total frequency of $t_i$.

In one example, the symmetric TC relevance measure between two tags is defined as follows:

$$R_{tag}^s(t_i, t_j) = \frac{|t_i \cap t_j|}{|t_i \cup t_j|}$$

where the symmetric TC relevance measure results from the number of interactions between the two tags divided by the union of the two tags. In general, the symmetric TC relevance measure tends to indicate whether two tags have similar meaning.

In one example, such tag co-occurrence measures are based at least on the written description and figures of commonly-owned patent application Ser. No. 12/340,632, filed Dec. 19, 2008, which is herein incorporated by reference in its entirety.

Block 130 typically indicates an element(s) that generates an inverted tag table based on the tags from block 120. In one example, the inverted tag table is represented as a table of tags with media attributes. That is, the inverted tag table includes the tags from block 120, each tag with the media instances identified by that tag, the associated media instances listed as attributes of the tag, Providing such an inverted tag table may improve the efficiency of later processing, such as in the generation of visual language models and the like.

Block 140 typically indicates an element(s) that generates a visual language model ("VLM") based on media associated with the tags and produces tag similarity measures in the visual domain. Such a model may be generated very quickly making it applicable for large-scale datasets. Such a model tends to capture the frequency of visual features associated with a tag as well as the spatial relationship between neighboring visual features. Input to block 140 typically comes from the output of block 130 in the form of a collection of media instances associated with a particular tag. In one example, this collection of images comes from the inverted tag table provided by the element(s) of block 130.

In one example, such visual language modeling is based at least on the written description and figures of commonly-owned patent application Ser. No. 11/847,959, filed Aug. 30, 2007, which is herein incorporated by reference in its entirety.

Block 150 typically indicates an element(s) that generates tag content correlation ("TTC") measures. In one example, visual language modeling provides for such content-based media classification. In this example, a media instance associated with a particular tag is transformed into a matrix of visual words assuming that each visual word is conditionally dependent on its neighbors. For each media collection (e.g., media instances associated with the same tag) a VLM is generated. In particular, a TCC relevance measure between two different tags can be computed based on two VLMs of two media collections, each collection based on a distinct one of the two different tags. In one example, a first VLM is generated based on a media collection corresponding to the user-provided tag, a second VLM is generated based on a media collection corresponding to a tag that co-occurs with the user-provided tag, and a relevance measure is computed based on the two VLMs. The second VLM can be re-generated for each of any other co-occurring tags. All of the relevance measures between the user-provided tag and the co-occurring tags may be ordered by relevance (along with their corresponding tag pairs) for later ranking. Thus, content information may be used to provide a measure of tag similarity, or a TCC relevance measure. Using a digital image and an associated tag as an example, to generate a VLM the image is first divided into uniformly distributed equal-sized patches. One or more visual features, such as color moment, texture, etc., are calculated for each patch. Each calculated visual feature may be coded into a visual word by k-means clustering or a hash coding. Such a VLM may be divided into unigram, bigram, and trigram models, typically based on different visual context constraints. For a unigram model, the output is typically a visual word distribution given a tag. For a bigram model, the output is typically a distribution of visual words given a tag and a neighboring visual word. The tri-gram model assumes the visual words are correlated to two of their neighboring words, so the output is typically a distribution given a tag and two neighboring visual words. In summary, for all types of VLM, the content representation of a tag tends to be a distribution.

In general, tag similarity can be measured based on the similarity of the VLMs of the media associated with the tags. That is, if two tags are semantically correlated then the associated media probably share some common objects, elements, scenes, or the like. Because a VLM captures visual statistics associated with a tag, and each VLM is a conditional distribution, a visual distance between the tags can be computed. For example, given tag $t_i$, a set of images tagged with tag $t_i$ is collected. VLMs are generated based on the images to represent the content of the tag, and the visual distance between the content is measured using Kullback-Leibler ("KL") divergence. The reciprocal of the visual distance is adopted to measure tag correlation. Such TCC relevance measures may be divided into symmetric and asymmetric measures. In one example, the asymmetric content distance ($D_{TCC}^a(t_i, t_j)$) and the corresponding asymmetric TCC relevance measure ($R_{TCC}^a(t_i, t_j)$) are defined as follows:

$$D_{TCC}^a(t_i, t_j) = KL(L(t_i) \| L(t_j))$$

$$R_{TCC}^a(t_i, t_j) = \frac{1}{D_{TCC}^a(t_i, t_j)}$$

where $L(t_i)$ represents the VLM for tag $t_i$, $L(t_j)$ represents the VLM for tag $t_j$, and $KL(\bullet)$ is the KL distance between two visual language models. $D_{TCC}^a(t_i, t_j)$ may also be known as the asymmetric tag correlation measure. In one example, only the bigram model is adopted for simplicity.

In one example, the symmetric content distance ($D_{TCC}^s(t_i, t_j)$) and corresponding symmetric TCC relevance measure ($R_{TCC}^s(t_i, t_j)$) are defined as follows:

$$D_{TCC}^s(t_i, t_j) = \frac{1}{2}[KL(L(t_i) \| M) + KL(L(t_j) \| M)]$$

$$M = \frac{1}{2}[L(t_i) + L(t_j)]$$

$$R_{TCC}^s(t_i, t_j) = \frac{1}{D_{TCC}^s(t_i, t_j)}$$

where M is the average language model between the two tags. $D_{TCC}^s$ may also be known as the symmetric tag correlation measure. The symmetric TCC relevance measure of the tags $R_{TCC}^s$ is defined as the reciprocal of their symmetric content distance.

Block 155 typically indicates an element(s) that generates image-conditioned tag correlation ("ITC") measures, a measure where tag similarity is conditioned on associated media content. For example, an image tagged "apple" and an image tagged "pear" may be considered similar (both referring to "fruit") based on a TCC relevance measure or the like. But if the image tagged "apple" is that of an iPod music player, then the two are not actually similar. Thus an image-conditioned tag correlation measure can be used in further improving tag recommendations. Input to block 155 typically comes from the output of block 140, that is visual language models.

Tags that are similar may have a likelihood of their associated media also being similar. For example, given a target image, such as example image 180, the likelihood that a tag is descriptive of the image may be represented by unigram, bigram, and trigram visual language models. Three such likelihoods can be taken as the location of a tag in a likelihood space. In particular, consider a target image x for a tag recommendation, such as example image 180. Let $x_k$, k=1, ..., L be L other images associated with a tag t∈T where T is a tag corpus, such as that of example media store 110. Then image-conditioned tag similarity between target tag t and each of the candidate tags can be defined by likelihood $\mathcal{L}$:

$$\mathcal{L}_t^m(x) \propto P(x | VLM_t^m)$$

where P is the probability that tag t is descriptive of image x. The visual language model can be further represented in unigram, bigram, and trigram models, typically based on different visual context constraints as described in connection with block 140. In one example, these forms are defined as (sequentially shown in uni-, bi-, and then tri-gram forms):

$$\mathcal{L}_t^m(x) \propto \prod_{ij} P(w_{ij} | VLM_t^m)$$

$$\mathcal{L}_t^m(x) \propto \prod_{i=1}^{n-1} P(w_{i0} | VLM_t^m) \prod_{j=1}^{n-1} P(w_{ij} | w_{i,j-1}, VLM_t^m)$$

$$\mathcal{L}_t^m(x) \propto P(w_{00} | VLM_t^m) \prod_{j=1}^{n-1} P(w_{0j} | w_{0,j-1},$$

$$VLM_t^m) \prod_{i=1}^{n-1} P(w_{i0} | w_{i-1}, VLM_t^m) \prod_{i,j=1}^{n-1} P(w_{ij} | \dot{w}_{i-1,j} w_{i,j-1}, VLM_t^m)$$

where $VLM_t^m$ is the m-gram visual language Model for the $t^{th}$ tag. For simplicity, the three kinds of likelihood functions are denoted with the index m=1, 2, 3 respectively, where m=1 indicates the unigram model; m=2 indicates the bigram model; and m=3 indicates the trigram model. In one example, the m-gram used may be either the unigram model, the bigram model, or the trigram model.

Figure 2:
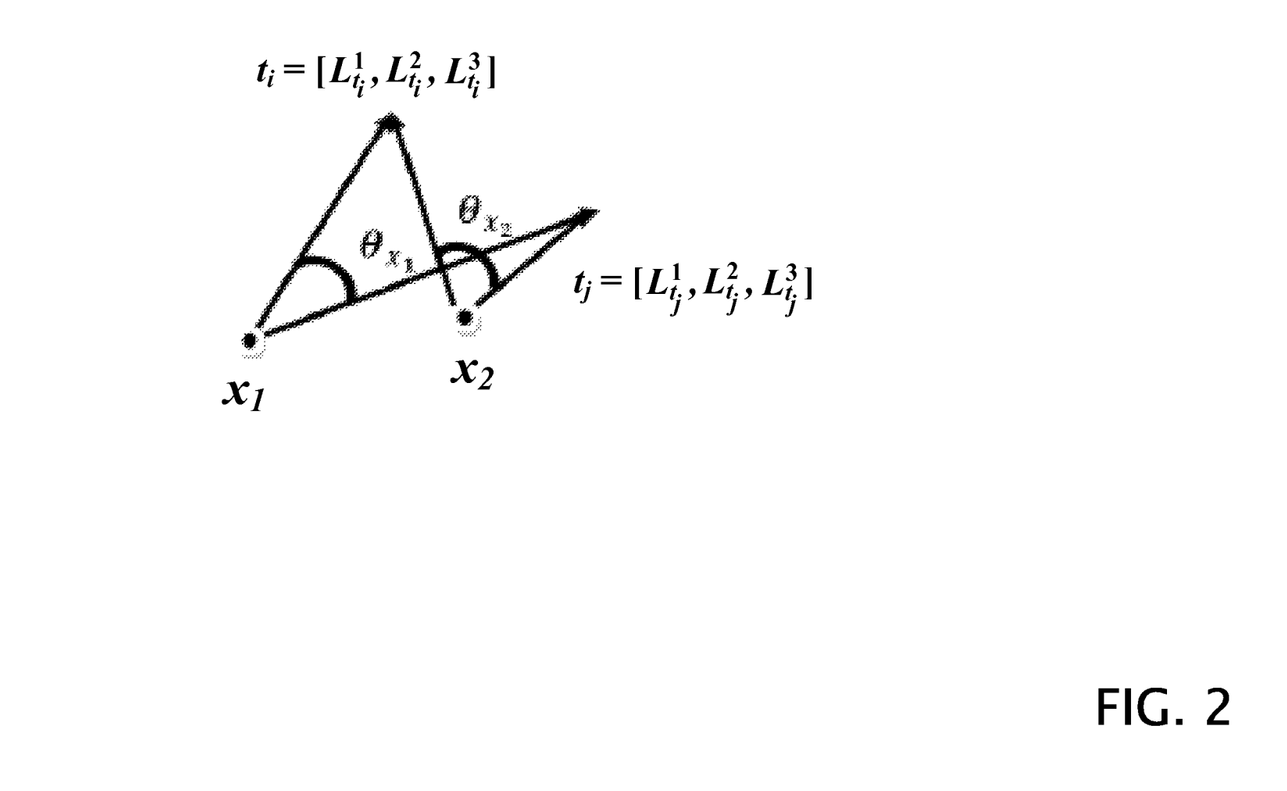
FIG. 2 is a diagram showing the distance between two tags defined in the likelihood space as the inter-product of two likelihood vectors.
Figure 3:
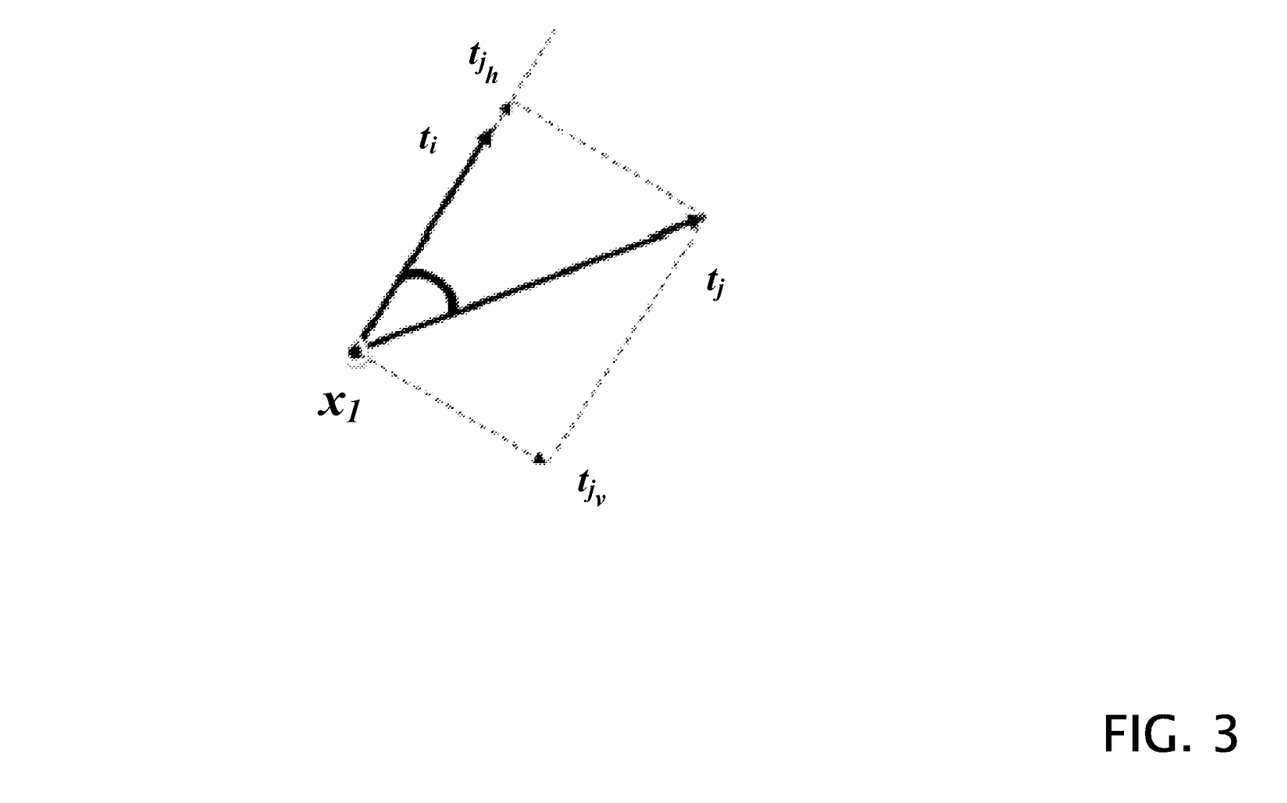
FIG. 3 is a diagram showing a relevance decomposition of a three-dimensional vector decomposed into a relevant component and an irrelevant component.

In one example, considering image $x_1$, each tag $t_i$ and $t_j$ is represented by the three likelihood values $\mathcal{L}$ corresponding to the unigram, bigram, or trigram visual language models respectively, as shown in FIG. 2. The distance between the two tags $t_i$ and $t_j$ is defined in the likelihood space as the inter-product of the two likelihood vectors of image $x_1$, for example. Such a distance may be defined in a symmetric form:

$$D_{ITC}^s(t_i, t_j, x) = \frac{L_{t_i}(x) \cdot L_{t_j}(x)}{\|L_{t_i}(x)\| \|L_{t_j}(x)\|}$$

where $L_{t_i}(x) = [\mathcal{L}_{t_i}^1, \mathcal{L}_{t_i}^2, \mathcal{L}_{t_i}^3]$, and where such a distance may also be defined in an asymmetric form:

$$D_{ITC}^a(t_i, t_j, x) = \left\| \frac{L_{t_i}(x) \cdot L_{t_j}(x)}{\|L_{t_i}(x)\|} - L_{t_i}(x) \right\|$$

where $t_i$ is typically an initial tag (e.g., user-provided) corresponding to the target image, and $t_j$ is a novel tag (e.g., a similar tag, such as those provided by block 140). The corresponding symmetric ($R_{ITC}^s(t_i, t_j, x)$) and asymmetric ($R_{ITC}^a(t_i, t_j, x)$) ITC relevance measures are defined as the inverse of the corresponding distances:

$$R_{ITC}^s(t_i, t_j, x) = \frac{1}{D_{ITC}^s(t_i, t_j, x)}$$

$$R_{ITC}^a(t_i, t_j, x) = \frac{1}{D_{ITC}^a(t_i, t_j, x)}.$$

ITC relevance measures provide a measure in which contents are compared directly in determining tag similarity. Thus, in the image-conditioned tag correlation relevance measures, the tag similarity is conditioned on the target image, thus providing for tag recommendations of increased quality.

Block 170 typically indicates an element(s) that combines multi-domain relevance measures and provides tag recommendations. The combining of multi-domain relevance generally refers to combining relevance measures from the semantic domain (e.g., TC relevance measures) and from the visual domain (e.g., TCC and ITC relevance measures). Because these relevance measures are generated from different domains the linear combination of these measures may not be appropriate. Thus a RankBoost algorithm is used to generate a reasonable combination based on the relative order of the relevance measures forming the input recommendations. In one example, such input recommendations are in the form of relevance-based sample tags output from blocks 150, 155, and 160.

Using the RankBoost algorithm, each sample tag of the input recommendations is considered an instance. All sample tags of the input recommendations taken together form instance space X. For each weak ranker (provider of relevance-based sample tags, such as the elements of blocks 150, 155, and 160) a function $f_i$ is generated that maps an instance $x_i$ from instance space X to a ranking space R, with each such mapping of $x_i$ considered a ranking feature. In general, a ranking feature is any measurement indicating the relative order between two instances. Such measurements typically need only indicate relative order of instances and not the distance between instances. For example, the measurement $f_i(x_1) > f_i(x_2)$ indicates that the ranking feature of $x_i$ is superior to that of $x_2$. But the magnitude $|f_i(x_1) - f_i(x_2)|$ is meaningless. Based on these properties, ranking features can be generated for instances from different domains, such as semantic and visual domains.

Given example image 180 and one or more initial user-provided tags for the image, a list of related tags that may also be applicable to the image is to be recommended. The set of initial tags is denoted as $\mathcal{OT}$, and the set of sample tags (also called remaining tags) for recommendation is denoted as $\mathcal{UT}$. The relevance of the tags is presented in two domains, the semantic domain and the visual domain. Several ranking features $\{f_l\}_{l=1}^{3n}$ generated where n is the number of initial tags. The first n ranking features are generated by $f_l(t_i, t_j)$ and are based on TC relevance measures; the next n ranking features are generated by $f_{n+l}(t_i, t_j)$ and are based on TCC relevance measures. And the third n ranking features are generated by $f_{2n+l}(t_i, t_j)$ and are based on ITC relevance measures, as follows:

$$f_l(t_i, t_j) = R_{TC}^s(t_i, t_j), t_j \in OT, t_i \in UT, l = 1, \ldots, n$$

$$f_{n+l}(t_i, t_j) = R_{TCC}^s(t_i, t_j), t_j \in OT, t_i \in UT, l = 1, \ldots, n$$

$$f_{2n+l}(t_i, t_j) = R_{ITC}^s(t_i, t_j), t_j \in OT, t_i \in UT, l = 1, \ldots, n$$

The resulting ranking features are combined using a RankBoost algorithm or the like. In one example, the RankBoost algorithm is as shown in Algorithm 1:

---
Algorithm 1 Cross domain Rankboost training process

---
Input: Given tags $t_1, \ldots, t_n \in \mathcal{OT}$, and $t_1, \ldots, t_m \in \mathcal{UT}$, and distribution D over $\mathcal{UT} \times \mathcal{UT}$.
where
   $\mathcal{OT}$ is the set of the initial tags.
   $\mathcal{UT}$ is the set of the remaining tags in the database.
Initialize $D_1 = D$.
Generate ranking features $\{ft\}_{l=1}^{3n}$; $\forall t_i \in \mathcal{UT}, t_j \in \mathcal{OT}$
   $f_l(t_i, t_j) = R_{TC}^s(t_i, t_j), l = 1, \ldots, n$
   $f_{n+l}(t_i, t_j), = R_{TCC}^s(t_i, t), l = 1, \ldots, n$
   $f_{n+l}(t_i, t_j), = R_{ITC}^s(t_i, t), l = 1, \ldots, n$
   where $t_i \in \mathcal{UT}, t_j \in \mathcal{OT}$
for $k = 1, \ldots, K$. do
   Select pair $(t_i, t_j) \in \mathcal{UT} \times \mathcal{UT}$ with distribution D.
   Get weak ranking $h_k$ from ranking features of selected pairs Update: $\alpha_k = \frac{1}{2} \ln\left(\frac{1+r}{1-r}\right)$, where $r = \sum_{t_i, t_j} D_k(h_k(t_i) - h_k(t_j))$ Update: $D_{k+1}(t_i, t_j) = \frac{D_k(t_i, t_j) \exp(\alpha_k(h_k(t_i) - h_k(t_j)))}{Z_k}$.

where $Z_k$ is a normalization factor.

end for
$Z_k = \sum_{t_i, t_j} D_k(t_i, t_j) \exp(\alpha_k(h_k(t_i) - h_k(t_j)))$ Output the final ranking:
$$H(t) = \sum_{k=1}^{K} \alpha_k h_k(t).$$

---

In one example, the top N relevant tags, according to Algorithm 1, are recommended to the user for further potential tagging of image 180. In this example, N may be a relatively small number, such as 5. In one example, such a RankBoost algorithm is described in the paper, "An Efficient Boosting Algorithm for Combing Preferences", *Proceedings of ICML '98*, 1998, by Y. Freund et al., which is herein incorporated by reference in its entirety.

Block 190 typically indicates considering the list of recommended tags and potentially tagging the image, such as example image 180, using one or more of the recommended tags. In one example, this considering and potential tagging is performed by a human user. The human user may or may not be the same user that provided the initial tag(s).

Figure 4:
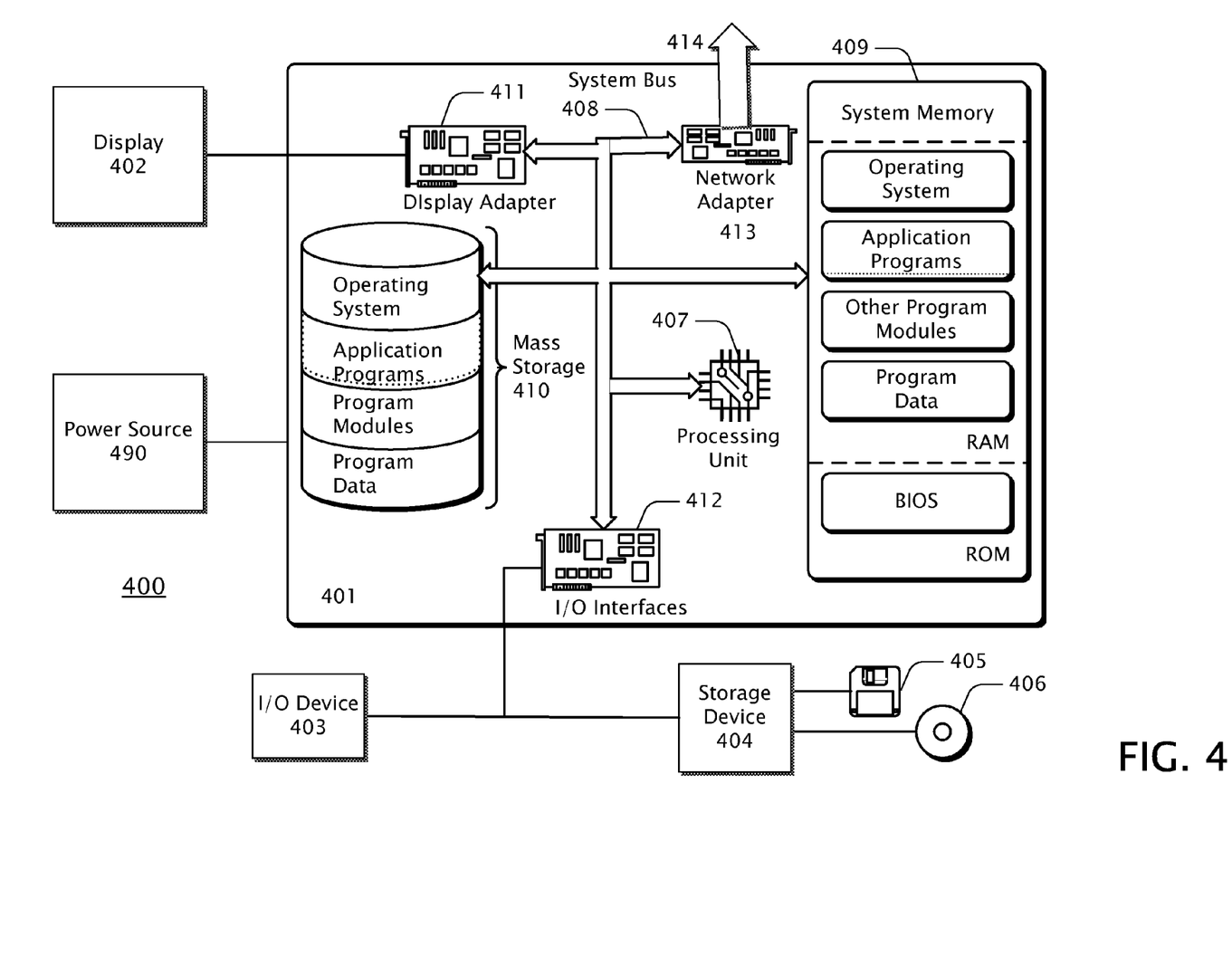
FIG. 4 is a block diagram showing an example computing environment 400 in which the technologies described herein may be implemented.

FIG. 4 is a block diagram showing an example computing environment 400 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 400 typically includes a general-purpose computing system in the form of a computing device 401 coupled to various components, such as peripheral devices 402, 403, 404 and the like. System 400 may couple to various other components, such as input devices 403, including voice recognition, touch pads, buttons, keyboards and/or pointing devices, such as a mouse or trackball, via one or more input/output ("I/O") interfaces 412. The components of computing device 401 may include one or more processors (including central processing units ("CPU"), graphics processing units ("GPU"), microprocessors ("µP"), and the like) 407, system memory 409, and a system bus 408 that typically couples the various components. Processor 407 typically processes or executes various computer-executable instructions to control the operation of computing device 401 and to communicate with other electronic and/or computing devices, systems or environment (not shown) via various communications connections such as a network connection 414 or the like. System bus 408 represents any number of several types of bus structures, including a memory bus or memory controller, a peripheral bus, a serial bus, an accelerated graphics port, a processor or local bus using any of a variety of bus architectures, and the like.

System memory 409 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 409 typically stores data, computer-executable instructions and/or program modules comprising computer-executable instructions that are immediately accessible to and/or presently operated on by one or more of the processors 407.

Mass storage devices 404 and 410 may be coupled to computing device 401 or incorporated into computing device 401 via coupling to the system bus. Such mass storage devices 404 and 410 may include non-volatile RAM, a magnetic disk drive which reads from and/or writes to a removable, non-volatile magnetic disk (e.g., a "floppy disk") 405, and/or an optical disk drive that reads from and/or writes to a non-volatile optical disk such as a CD ROM, DVD ROM 406. Alternatively, a mass storage device, such as hard disk 410, may include non-removable storage medium. Other mass storage devices may include memory cards, memory sticks, tape storage devices, and the like.

Any number of computer programs, files, data structures, and the like may be stored in mass storage 410, other storage devices 404, 405, 406 and system memory 409 (typically limited by available space) including, by way of example and not limitation, operating systems, application programs, data files, directory structures, computer-executable instructions, and the like.

Output components or devices, such as display device 402, may be coupled to computing device 401, typically via an interface such as a display adapter 411. Output device 402 may be a liquid crystal display ("LCD"). Other example output devices may include printers, audio outputs, voice outputs, cathode ray tube ("CRT") displays, tactile devices or other sensory output mechanisms, or the like. Output devices may enable computing device 401 to interact with human operators or other machines, systems, computing environments, or the like. A user may interface with computing environment 400 via any number of different I/O devices 403 such as a touch pad, buttons, keyboard, mouse, joystick, game pad, data port, and the like. These and other I/O devices may be coupled to processor 407 via I/O interfaces 412 which may be coupled to system bus 408, and/or may be coupled by other interfaces and bus structures, such as a parallel port, game port, universal serial bus ("USB"), fire wire, infrared ("IR") port, and the like.

Computing device 401 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 401 may be coupled to a network via network adapter 413 or the like, or, alternatively, via a modem, digital subscriber line ("DSL") link, integrated services digital network ("ISDN") link, Internet link, wireless link, or the like.

Communications connection 414, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 490, such as a battery or a power supply, typically provides power for portions or all of computing environment 400. In the case of the computing environment 400 being a mobile device or portable device or the like, power source 490 may be a battery. Alternatively, in the case computing environment 400 is a desktop computer or server or the like, power source 490 may be a power supply designed to connect to an alternating current ("AC") source, such as via a wall outlet.

Some mobile devices may not include many of the components described in connection with FIG. 4. For example, an electronic badge may be comprised of a coil of wire along with a simple processing unit 407 or the like, the coil configured to act as power source 490 when in proximity to a card reader device or the like. Such a coil may also be configure to act as an antenna coupled to the processing unit 407 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 402, I/O device 403, or many of the other components described in connection with FIG. 4. Other mobile devices that may not include many of the components described in connection with FIG. 4, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method comprising:
    generating, by a computer, a first ranking feature based on a first measure of semantic correlation between a first media collection corresponding to a first tag and a second media collection corresponding to a second tag that co-occurs with the first tag, the first measure based on tag similarity in a semantic domain;
    generating, by the computer, a second ranking feature based on a second measure of visual correlation between the first media collection corresponding to the first tag and the second media collection corresponding to the second tag that co-occurs with the first tag, the second measure based on media instance similarity in a visual domain;
    combining the first ranking feature and the second ranking feature, where the combined first and second ranking features indicate a relative order between the first tag and the second tag but do not indicate a distance between the first tag and the second tag.

2. The method of claim 1 where the tag similarity is based on a co-occurrence frequency of the second tag with the first tag, the co-occurrence frequency normalized by a total frequency of the second tag.

3. The method of claim 1 where the tag similarity is based on a number of interactions between the first tag and the second tag divided by a union of the first tag and the second tag.

4. The method of claim 1 where the media instance similarity is based on a visual distance between the first tag and the second tag.

5. The method of claim 1 further comprising generating a third ranking feature based on a third measure of image-conditioned tag correlation between the first media collection corresponding to the first tag and the second media collection corresponding to the second tag that co-occurs with the first tag, the third measure based on media content similarity in a visual domain.

6. The method of claim 5, the combining further comprising combining the third ranking feature with the first ranking feature and the second ranking feature, where the combined first, second, and third ranking features indicate the relative order between the first tag and the second tag but do not indicate the distance between the first tag and the second tag.

7. The method of claim 5 where the media content similarity is based on a visual similarity between first media content corresponding to the first tag and second media content corresponding to the second tag.

8. At least one computer-readable media storing computer-executable instructions that, when executed by a computer, cause the computer to perform a method comprising:
    generating a first ranking feature based on a first measure of semantic correlation between a first media collection corresponding to a first tag and a second media collection corresponding to a second tag that co-occurs with the first tag, the first measure based on tag similarity in a semantic domain;
    generating a second ranking feature based on a second measure of visual correlation between the first media collection corresponding to the first tag and the second media collection corresponding to the second tag that co-occurs with the first tag, the second measure based on media instance similarity in a visual domain;
    combining the first ranking feature and the second ranking feature, where the combined first and second ranking features indicate a relative order between the first tag and the second tag but do not indicate a distance between the first tag and the second tag.

9. The at least one computer-readable media of claim 8 where the tag similarity is based on a co-occurrence frequency of the second tag with the first tag, the co-occurrence frequency normalized by a total frequency of the second tag.

10. The at least one computer-readable media of claim 8 where the tag similarity is based on a number of interactions between the first tag and the second tag divided by a union of the first tag and the second tag.

11. The at least one computer-readable media of claim 8 where the media instance similarity is based on a visual distance between the first tag and the second tag.

12. The at least one computer-readable media of claim 8, the method further comprising generating a third ranking feature based on a third measure of image-conditioned tag correlation between the first media collection corresponding to the first tag and the second media collection corresponding to the second tag that co-occurs with the first tag, the third measure based on media content similarity in a visual domain.

13. The at least one computer-readable media of claim 12, the combining further comprising combining the third ranking feature with the first ranking feature and the second ranking feature, where the combined first, second, and third ranking features indicate the relative order between the first tag and the second tag but do not indicate the distance between the first tag and the second tag.

14. The at least one computer-readable media of claim 12 where the media content similarity is based on a visual similarity between first media content corresponding to the first tag and second media content corresponding to the second tag.

15. A method comprising:
    generating, by a computer, a first measure of semantic correlation between a first media collection corresponding to a first tag and a second media collection corresponding to a second tag that co-occurs with the first tag, the first measure based on tag similarity in a semantic domain;

generating, by the computer, a second measure of visual correlation between the first media collection corresponding to the first tag and the second media collection corresponding to the second tag that co-occurs with the first tag, the second measure based on media instance similarity in a visual domain; and recommending a co-occurring tag that corresponds to the first tag based on the first measure or the second measure.

16. The method of claim 15 where the tag similarity is based on a co-occurrence frequency of the second tag with the first tag, the co-occurrence frequency normalized by a total frequency of the second tag.

17. The method of claim 15 where the tag similarity is based on a number of interactions between the first tag and the second tag divided by a union of the first tag and the second tag.

18. The method of claim 15 where the media instance similarity is based on a visual distance between the first tag and the second tag.

19. The method of claim 15 further comprising generating a third ranking feature based on a third measure of image-conditioned tag correlation between the first media collection corresponding to the first tag and the second media collection corresponding to the second tag that co-occurs with the first tag, the third measure based on media content similarity in a visual domain.

20. The method of claim 19 where the media content similarity is based on a visual similarity between first media content corresponding to the first tag and second media content corresponding to the second tag.

* * * * *